United States Patent [19]
Okazaki et al.

[11] Patent Number: 4,952,449
[45] Date of Patent: Aug. 28, 1990

[54] BIAXIALLY ORIENTED POLYESTER FILM

[75] Inventors: Iwao Okazaki, Mukou; Koichi Abe, Kyoto; Shoji Nakajima, Ootsu; Kiyohiko Ito, Ootsu; Satoru Nishino, Ootshu; Hidehito Minamizawa, Ootsu, all of Japan

[73] Assignee: Toray Industries, Inc.

[21] Appl. No.: 254,320

[22] Filed: Oct. 5, 1988

[30] Foreign Application Priority Data

Oct. 9, 1987 [JP] Japan .................................. 62-255555
Nov. 20, 1987 [JP] Japan .................................. 62-294847
Feb. 1, 1988 [JP] Japan .................................. 63-25510

[51] Int. Cl.$^5$ .................... B32G 27/36; B32G 3/00; B32G 27/04
[52] U.S. Cl. .................................... 428/147; 428/143; 428/148; 428/149; 428/323; 428/480; 428/694
[58] Field of Search ............... 428/141, 480, 694, 900, 428/143, 402

[56] References Cited

U.S. PATENT DOCUMENTS

| 4,539,260 | 9/1985 | Abe et al. | 428/900 X |
| 4,578,729 | 3/1986 | Suzuki et al. | 428/900 X |
| 4,615,939 | 10/1986 | Corsi et al. | 428/328 X |
| 4,670,319 | 6/1987 | Katoh et al. | 428/480 X |
| 4,680,217 | 7/1987 | Kanesaki et al. | 428/480 X |
| 4,720,412 | 1/1988 | Katoh et al. | 428/480 X |
| 4,767,657 | 8/1988 | Sakamoto et al. | 428/480 X |
| 4,778,708 | 10/1988 | Nishino et al. | 428/480 X |
| 4,798,759 | 1/1989 | Dallman et al. | 428/480 X |

Primary Examiner—George F. Lesmes
Assistant Examiner—Elizabeth M. Cole
Attorney, Agent, or Firm—Austin R. Miller

[57] ABSTRACT

A biaxially oriented polyester film suited as a substrate for magnetic recording media. The film comprises a polyester and inert particles and has at least one surface with protrusions formed by the existence of the inert particles. The surface has a parameter of surface topography $\sqrt{(\beta/\sigma)}$ of 0.1 to 0.7. The average distance between adjacent protrusions is not more than 20 um and the coefficient of friction of the surface and the parameter of surface topography satisfies the following equations (1) and (2):

$$y \geq 0.171 \sqrt{(\beta/\sigma)} + 0.15 \quad (1)$$

$$y \leq 0.171 \sqrt{(\beta/\sigma)} + 0.25 \quad (2)$$

wherein y is the coefficient of friction, $\beta$ is mean flatness of protrusions and $\sigma$ is standard deviation of height distribution of protrusions.

7 Claims, No Drawings

BIAXIALLY ORIENTED POLYESTER FILM

BACKGROUND OF THE INVENTION

I. Field of the Invention

This invention relates to a biaxially oriented polyester film. More particularly, this invention relates to a biaxially oriented polyester film suited as a substrate for magnetic recording media, with which a high quality picture can be obtained and which gives an excellent abrasion resistance.

II. Description of the Related Art

As a substrate for magnetic recording media such as video tapes and audio tapes, biaxially oriented polyester films are conventionally used. To give good slipping to the recording media, the conventional substrates contain particles by which protrusions are formed in a surface of the film. The protrusions reduce the coefficient of friction of the film so as to give good slipping to the media.

U.S. Pat. No. 4,720,412 discloses a biaxially oriented film suited as the substrate for magnetic recording media, of which protrusions have specific height and number. The film disclosed in this USP has a drawback that the surface of the film is likely to be scratched by a roll or a guide which contacts the film in the process of applying the magnetic layer, in calendering process or in the process of dubbing a finished video tape or the like to manufacture a soft tape. Since these processes are conducted with higher speed recently than before, the tendency to be scratched is becoming a big problem. Further, conventional magnetic recording tapes have a disadvantage in that when dubbed, the quality of the picture is degraded, i.e., the S/N ratio (signal/noise ratio) of the dubbed tape is unsatisfactorily low.

SUMMARY OF THE INVENTION

Accordingly, the object of the present invention is to provide a polyester film suited as a substrate for magnetic recording media, which is hardly scratched even in a high speed process (hereinafter referred to as having good scratch resistance), and with which the degradation of the picture caused by dubbing is reduced (hereinafter referred to as having good dubbing).

That is, this invention provides a biaxially oriented polyester film comprising a polyester and inert particles, which film has at least one surface with protrusions formed by the existence of the inert particles, the surface having a parameter of surface topography $\sqrt{(\beta/\sigma)}$ of 0.1 to 0.7, the average distance between adjacent protrusions being not more than 20 μm, the coefficient of friction of the surface and the parameter of surface topography satisfying the following equations (1) and (2):

$$y \geq 0.171 \sqrt{(\beta/\sigma)} + 0.15 \quad (1)$$

$$y \leq 0.171 \sqrt{(\beta/\sigma)} + 0.25 \quad (2)$$

wherein y is the coefficient of friction, $\beta$ is mean flatness of protrusions and $\sigma$ is standard deviation of height distribution of protrusions.

According to the present invention, a novel polyester film is provided, which is suited as a substrate for magnetic recording media. By employing the polyester film of the present invention as the substrate for a magnetic recording medium, the magnetic recording medium is hardly scratched even in high speed processing, and the quality of the picture of the dubbed medium is higher than those of the conventional media. Further, the polyester film does not detrimentally influence the magnetic layer formed thereon and gives good slipping property to the recording medium. Thus, by employing the polyester film of the present invention as the substrate, an excellent magnetic recording medium can be constructed.

DESCRIPTION OF THE PREFERRED EMBODIMENTS

The polyester film of the present invention comprises a polyester and inert particles. The polyester employed in the present invention is one having aromatic dicarboxylic acid as the main acid component and an aromatic or aliphatic diol as the main glycol component. Although any polyester may be employed as long as it can be formed into a film, those polyesters including ethyleneterephthalate, ethylene-α, β-bis(2-chlorophenoxy)ethane-4,4'-dicarboxylate and/or ethylene-2,6-naphthalate unit as the major constituent are preferred. It should be noted, however, as long as the advantageous effect of the present invention is not degraded, small amounts preferably not more than 15 mol % of other components may be copolymerized.

Although not restricted, the preferred examples of the inert particles contained in the film of the present invention include substantially spherical silica particles originated from colloidal silica, synthetic calcium carbonate particles, titanium dioxide (rutile) particles, thermal type carbon black, and organic polymer particles such as crosslinked polymer particles, especially crosslinked styrene-divinyl benzene micro-spheres. Although the average diameter d (μm) and the content C (% by weight) of the particles are not restricted, if these satisfy the following equation (3), the scratch resistance is further promoted and better dubbing may be obtained. Further, the mean distance between the adjacent protrusions required in the present invention may easily be obtained.

$$0.01/d \leq C \leq 0.45/d \quad (3)$$

Two or more kinds of particles may be contained in the film. In cases where a mixture of two or more kinds of particles with different average diameter is employed, the average diameter d in the above-described equation (3) means the average diameter of the overall particles, and the content C in the equation (3) means the total content of the particles. The preferred range of the average diameter of the particles is 0.2–0.7 μm for silica particles, carbon black and organic polymer particles, and 0.3–1.2 μm for calcium carbonate particles and titanium dioxide particles.

Non-incorporated particles may be used as the inert particles. The non-incorporated particles herein means particles generated by bonding at least one compound selected from the group consisting of calcium compounds, magnesium compounds and lithium compounds added at the time of polymerization for forming the polyester and a polyester component. It should be noted that phosphorus and trace amounts of other metal components such as zinc, cobalt, antimony, germanium and titanium may compose the non-incorporated particles in an amount not degrading the advantageous effects of the present invention. In cases where non-incorporated particles are employed together with the added inert particles, the preferred content of the added inert particles ranges from 0.01 to 0.3% by weight since the scratch resistance is promoted and good dubbing may be obtained.

Although the film of the present invention mainly is composed of the above-described composition, as long as the advantageous effects of the present invention are not degraded, other polymers may be blended. Further, the film of the present invention may contain inorganic and/or organic additives such as anti-oxidants, thermal stabilizers, lubricants, ultra-violet absorbers and nuclear initiators in the amount conventionally employed in the polyester substrates.

The polyester film of the present invention is a biaxially oriented film. Non-oriented films and uni-oriented films are not preferred since the scratch resistance is not good and good dubbing cannot be obtained. Although the ratio of the refractive indices in the direction of thickness, which indicates the degree of orientation, is not restricted, it is preferably 0.935–0.975, more preferably 0.940–0.970.

The film of the present invention has at least one surface on which protrusions are formed due to the existence of the inert particles. The parameter of surface topography $\sqrt{(\beta/\sigma)}$ of the at least one surface with protrusions is 0.1 to 0.7, more preferably 0.15–0.65, still more preferably 0.25–0.62, wherein $\beta$ is mean flatness of protrusions and $\sigma$ is standard deviation of the height distribution of protrusions. The mean flatness of protrusions and the standard deviation of the height distribution of protrusions are determined as later described in detail. If the parameters of surface topography $\sqrt{(\beta/\sigma)}$ of both surfaces of the film are smaller than the above range, good dubbing is not obtained. On the other hand, if they are larger than the above range, scratch resistance is degraded.

At least one surface of the film of the present invention has a relationship between the coefficient of friction y and the parameter of surface topography $\sqrt{(\beta/\sigma)}$, which relationship satisfies the following equations (1) and (2), preferably (4) and (5), and more preferably (6) and (7):

$$y \geq 0.171 \sqrt{(\beta/\sigma)} + 0.15 \quad (1)$$

$$y \leq 0.171 \sqrt{(\beta/\sigma)} + 0.25 \quad (2)$$

$$y \geq 0.171 \sqrt{(\beta/\sigma)} + 0.16 \quad (4)$$

$$y \leq 0.171 \sqrt{(\beta/\sigma)} + 0.24 \quad (5)$$

$$y \geq 0.171 \sqrt{(\beta/\sigma)} + 0.17 \quad (6)$$

$$y \leq 0.171 \sqrt{(\beta/\sigma)} + 0.23 \quad (7)$$

If the coefficient of friction is smaller than the above-described range defined in the equation (1) in the both surfaces of the film, good dubbing is not obtained. On the other hand, if it is larger than the range defined in the equation (2), scratch resistance is degraded.

In the surface satisfying the equations (1) and (2), the average distance between adjacent protrusions is not more than 20 μm, preferably not more than 17 μm, and more preferably not more than 15 μm. If the average distances is larger than 20 μm, the scratch resistance is lowered. Although the average distance between the adjacent protrusions does not have a lower limit, about 1 μm may be the practical lower limit because protrusions with average distance of less than 1 μm are difficult to form.

In view of the scratch resistance, the average distance between adjacent protrusions with a height of less than 0.08 μm is preferably not more than 10 μm, more preferably not more than 8 μm, and average distance between adjacent protrusions with a height of 0.08–0.5 μm is preferably 15–150 μm, more preferably 20–100 μm. It should be noted that the number of protrusions with a height higher than 0.5 μm is preferably less than 5%, more preferably less than 2% of the total number of the protrusions.

Further, in view of the scratch resistance, the difference between the average height of protrusions with a diameter of less than 1 μm and the average height of protrusions with a diameter of 1–8μm is preferably 0.02–0.42 μm, more preferably 0.05–0.30 μm. The number of protrusions with a diameter of more than 8 μm is preferably less than 5%, more preferably less than 2% of the total number of the protrusions.

In view of the scratch resistance, the crystallization-promoting coefficient of the inert particles is preferably not higher than 15° C. The crystallization-promoting coefficient is determined as later described in detail.

In view of the scratch resistance and of better dubbing, the difference between the density of the inert particles and the density of the film is preferably not more than 0.65 g/cm$^3$, more preferably not more than 0.55 g/cm$^3$, still more preferably not more than 0.50 g/cm$^3$.

In view of the scratch resistance and of better dubbing, the at least one surface of the film of the present invention preferably has Rz (ten points average surface roughness) of 60–190 nm, more preferably 70–160 nm, still more preferably 80–150 nm.

In view of the scratch resistance and of obtaining better dubbing, the at least one surface of the film of the present invention preferably has Rp/Ra ratio (average depth/center line average surface roughness, both Rp and Ra are expressed in nm) of 4–25, more preferably 6–20, still more preferably 9–15.

In view of the scratch resistance and of better dubbing, the at least one surface of the film of the present invention preferably has an effective space volume ∅ of the protrusions of $1 \times 10^3$ - $5 \times 10^5$, more preferably $5 \times 10^3$ - $5 \times 10^4$.

In view of the scratch resistance and of better dubbing, the film of the present invention has a refraction index in the direction of thickness thereof of preferably 1.655–1.700, more preferably 1.675–1.700.

In view of the scratch resistance and of obtaining better dubbing, the at least one surface of the film of the present invention preferably has a ratio (H/d) of the average height (H) in nm of the protrusions to the average diameter d of the inert particles of 0.1–0.5, more preferably 0.1–0.4.

In view of the scratch resistance and of better dubbing, the at least one surface of the film of the present invention preferably has an average height of the protrusions of 40–130 nm, more preferably 50–120 nm, still more preferably 50–100 nm.

Although the use of the film of the present invention is not restricted, the film of the present invention is useful as a substrate for magnetic recording media for which the scratching of the surface in the processing steps should be avoided, especially as a substrate for video tapes which are now increasingly dubbed with the widespread use of video soft tapes. Further, in using the film of the present invention in which only one surface has the above-mentioned parameters, the surface with the parameters is preferably used as the running surface (i.e., in magnetic recording media, the surface on which the magnetic layer is not formed, and in the other uses, the surface on which a treatment such as printing and application of a layer is not performed).

The process of manufacturing the film of the present invention will now be described. It should be noted, however, the manufacturing process is not restricted to the process hereinafter described.

The inert particles may be added before, during, or after the polymerization for forming the polyester. To obtain the parameter of surface topography $\sqrt{(\beta/\sigma)}$ and the relationship between the coefficient of friction y and the parameter of surface topography defined in the present invention, it is preferred that the inert particles be added to the diol component of the polyester, such as ethyleneglycol in the form of a slurry. In this case, it is preferred that the diol component slurry containing the inert particles be filtered through a filter with an absolute filtration precision of 0.5–4.5 $\mu$m, more preferably 1.5–3 $\mu$m. As to the controlling method of the content of the inert particles, to obtain the parameter of surface topography $\sqrt{(\beta/\sigma)}$, the relationship between the coefficient of friction and the parameter of surface topography, and the average distance between the adjacent protrusions defined in the present invention, it is preferred to prepare polyester-based master pellets with a high content of the particles, preferably with a particle content of 1–5% by weight and then to dilute the master pellets during the formation of a film. In cases where the inert particles are substantially spherical silica particles originated from colloidal silica, to obtain the parameter of surface topography $\sqrt{(\beta/\sigma)}$, the relationship between the coefficient of friction and the parameter of surface topography, and the average distance between the adjacent protrusions defined in the present invention, it is preferred to heat the slurry of the diol component such as ethyleneglycol at 140°–200° C., more preferably 180°–200° C. for 30 minutes to 5 hours, more preferably 1–3 hours to bring the crystallization parameter $\Delta T_{cg}$ of the master pellets to a preferable range. It should be noted, that the crystallization parameter $\Delta T_{cg}$ is determined by the method later described in detail and its preferable range of the master pellet is usually 65°–95° C. Further, in this case, to obtain the preferred crystallization parameter and to obtain the parameter of surface topography $\sqrt{(\beta/\sigma)}$, the relationship between the coefficient of friction and the parameter of surface topography, and the average distance between the adjacent protrusions defined in the present invention, it is preferred to control the sodium content in the slurry to not more than 0.5% by weight, more preferably not more than 0.2% by weight and to control the pH of the slurry to 7–10. In cases where the inert particles are particles other than silica, such as calcium carbonate and titanium dioxide, to obtain the preferred crystallization parameter and to obtain the parameter of surface topography $\sqrt{(\beta/\sigma)}$, the relationship between the coefficient of friction and the parameter of surface topography, and the average distance between the adjacent protrusions defined in the present invention, it is preferred to add to the slurry ammonium phosphate in the amount of 0.5–2.0% by weight with respect to the weight of the particles. In using any of the particles, to obtain the parameter of surface topography $\sqrt{(\beta/\sigma)}$, the relationship between the coefficient of friction and the parameter of surface topography, and the average distance between the adjacent protrusions defined in the present invention, it is preferred to adjust the crystallization parameter $\Delta T_{cg}$ of the master pellets with high content of particles, especially 1–5% by weight, to 65°–95° C. by controlling the intrinsic viscosity of the master pellets and by selecting the copolymerization component in the master pellets, and then to dilute the master pellets, before the formation of the film, with polyester pellets which do not contain inert particles and which have a crystallization parameter smaller than that of the master pellets, which is preferably 55°–80° C. In this case, preferred copolymerized components include isophthalic acid component and cyclohexanedimethyleneglycol component, especially the latter.

In cases where the non-incorporated particles are utilized, the non-incorporated particles may be generated by adding at least one compound soluble in glycol selected from the group consisting of calcium compounds, magnesium compounds, manganese compounds and lithium compounds, preferably together with an acid and/or an ester compound of phosphorus in the process of polycondensation after direct esterification of the dicarboxylic acid and the diol, or in the process of polycondensation after ester interchange reaction between the dimethyl ester of the dicarboxylic acid component and the diol. The compounds of calcium, magnesium, manganese and lithium which may preferably be herein used include inorganic acid salts such as halogenides, nitrates and sulfates; organic acid salts such as acetates, oxalates and benzoates; hydrides; and oxides, which are soluble in glycol, as well as mixtures thereof. Preferred examples of the phosphorus compound which may be herein used include phosphates, phosphorous acid and phosphonic acid, as well as esters and partial esters thereof.

After sufficiently drying the pellets containing the prescribed amount of inert particles (more particularly, a mixture of the master pellets containing large amount of particles and the polyester pellets which do not substantially contain particles), the pellets are fed to a known extruder and are extruded from a slit-like die at a temperature of 270°–330° C. in the form of a sheet. The sheet is cooled and solidified on a casting roll to obtain a non-oriented film. To obtain the parameter of surface topography $\sqrt{(\beta/\sigma)}$, the relationship between the coefficient of friction and the parameter of surface topography, and the average distance between the adjacent protrusions defined in the present invention, the ratio of the width of the spinneret slit to the thickness of the non-oriented film is preferably 5–30, more preferably 8–20.

Then the non-oriented film is biaxially oriented by biaxial stretching. Either sequential biaxial stretching or simultaneous biaxial stretching may be employed. It should be noted, however, to obtain the parameter of surface topography $\sqrt{(\beta/\sigma)}$, the relationship between the coefficient of friction and the parameter of surface topography, and the average distance between the adjacent protrusions defined in the present invention, it is preferred to employ sequential biaxial stretching wherein the stretching in the longitudinal direction is first conducted and then the stretching in the transverse direction is conducted and wherein the stretching in the longitudinal direction is conducted in not less than three steps, preferably not less than 4 steps to obtain a stretching ratio in the longitudinal direction of 3.5–5.5 times. Further, to obtain the parameter of surface topography $\sqrt{(\beta/\sigma)}$, the relationship between the coefficient of friction and the parameter of surface topography, and the average distance between the adjacent protrusions defined in the present invention, it is preferred to conduct the first stretching in the longitudinal direction at a temperature between the glass transition temperature of the polymer minus 20° C. and the glass transition temperature of the polymer plus 5° C., and to conduct the subsequent stretching at a temperature higher than this range. The stretching rate may preferably be 5,000–50,000%/min. As a method of stretching in the transverse direction, a method in which a tenter is used is usually employed. The stretching ratio in the transverse direction may preferably be 3.0–5.0 times. The stretching rate in the transverse direction may preferably be 1,000–20,000%/min. Then the film is heat set. The heat setting may preferably be conducted at a temperature of 170°–220° C. for 0.5–60 seconds. It is useful for obtaining the average distance between the adjacent protrusions defined in the present invention to stretch the film in the transverse direction to 1.05–1.3 times, especially 1.05–1.2 times the original length during the heat setting.

[Methods of Determining Physical Properties and Methods of Evaluating Effects]

The methods of determining the physical properties relating to the present invention and methods of evaluating the effects are as follows:

(1) Average Diameter of the Particles

The polyester is removed from the sample film by subjecting the film to plasma treatment or by dissolving the film in o-chlorophenol. The residue is dispersed in ethanol and the volume average diameter of the particles are determined by centrifugal sedimentation (CAPA500 manufactured by Horiba Seisakusho, Japan was used).

(2) Content of Particles

A solvent such as o-chlorophenol, which dissolves the polyester but does not dissolve the particles is added to the polyester film and the mixture is heated to dissolve the polyester. The resultant is centrifuged and the obtained particles are dried in vacuum. The particles are subjected to differential scanning analysis using a DSC (differential scanning calorimeter). If a solution peak corresponding to the polymer is observed, additional solvent is added to the particles and the resultant is heated, followed by centrifugation. When the solution peak becomes unrecognizable, the remaining particles are the separated particles. Repeating the centrifugation twice is usually sufficient. The content of the particles is defined as the ratio (% by weight) of the total weight of the thus separated particles to the total weight of the film.

(3) Crystallization-promoting Coefficient and Crystallization Parameter $\Delta T_{cg}$ The crystallization-promoting coefficient and the crystallization parameter $\Delta T_{cg}$ are determined using a DSC as follows:

Ten milligrams of a sample is set in the DSC and then fused at 300° C. for 5 minutes, followed by rapid cooling in liquid nitrogen. The rapidly cooled sample is heated at a rate of 10° C./minute and the glass transition temperature is determined. The heating is continued to determine the peak of the generation of crystallization heat from the glass state. The thus determined peak is defined as the cold crystallization temperature $T_{cc}$, and the crystallization parameter $\Delta T_{cg}$ is defined as the difference between $T_g$ and $T_{cc}$ ($T_{cc}-T_g$).

The $\Delta T_{cg}(I)$ of a polyester containing 1% by weight of inert particles and the $\Delta T_{ch}(II)$ of a polyester having the same viscosity, from which the particles are removed are measured. The crystallization-promoting coefficient is defined as the difference between the $\Delta T_{cg}(II)$ and the $\Delta T_{cg}(I)$, i.e., $[\Delta T_{cg}(II) - \Delta T_{cg}(I)]$.

(4) Surface Roughness Ra, Rz and Rp

The surface roughness Ra, Rz and Rp is measured using a commercially available surface roughness meter (surface roughness meter ET-10 manufactured by Kosaka Kenkyusho, Japan was used) employing the following conditions:

Radius of Tip of Touching Needle: 0.5 μm
Load of Touching Needle: 5 mg
Length of Measured Portion: 1 mm
Cutoff Value: 0.08 mm Ra is determined according to DIN 4768.

Rz and Rp are calculated in accordance with the following equations:

Rz = (the third highest peak height) − (the third deepest valley depth)

Rp = (the highest peak height) − (the center line value)

In the Examples later described, the average of 20 times measurement is shown.

(5) Effective Space Volume $\emptyset$ of Protrusions

In the same manner as in (4), the surface roughness curves of the sample film is obtained. Peak-counting levels with intervals of 0.005 μm and parallel to each other are provided above the average curve (center curve) of the obtained curves. In the region of the average curve between the two points at which the average center curve crosses a curve, if a point at which the the average curve crosses the peak-counting level one time or more, the point is counted as one peak. The number of the peaks is determined in the measurement length. The number of the peaks is determined for each of the peak-counting levels, and the number of the peaks obtained for the "n"th peak-counting level is defined as PC(n). If the first peak-counting level for which the number of the peaks is zero is the "m"th counting level, the effective space volume $\emptyset$ is defined as follows:

$$\phi = \sum_{n=1}^{m-1} [n^3\{PC(n) - PC(n+1)\}]$$

(6) Refractive Index

The refractive index was measured using Abbe refractometer employing sodium D line (598 nm) as the light source. As the mounting solution, methylene iodide is employed and the measurement is conducted at 25° C., 65%RH.

(7) Ratio of Refractive Indices in the Direction of Thickness

The refractive index A in the direction of thickness of a film and the refractive index B in the direction of thickness of a non-oriented film obtained by fusing the film at 310° C. and then pressing the fused film, followed by rapid cooling in liquid nitrogen are determined by the same method as in (6). The ratio of refractive indices is defined as A/B.

(8) Average Height, Standard Deviation of Height Distribution, Flatness and Diameter of Surface Protrusions Using a scanning electromicroscope of two-detection type (ESM-3200 manufactured by Elionics Co., Ltd., Japan was used), the height of the protrusions is measured by scanning the surface of the film setting the flat region of the surface of the film to zero. The height of protrusions thus measured is transferred to an image processing system (IBAS2000 manufactured by Carl-zeiss Co., Ltd., Germany was used) as gray value of 256 grades and the image of the surface protrusions are reconstructed on the image processing system. The circle radius is calculated from the area of each protrusion with not less than 10 grades, which area is obtained by converting the grades into two values. The thus calculated circle radius is defined as the mean diameter of protrusions d (nm). The highest value in each two value-converted protrusion portions is defined as the height of the protrusion, and the height of the protrusion is determined for each protrusion. This measurement is repeated 500 times changing the measured area. For protrusions with a height of not less than 20 nm, the mean height H (nm) and the standard deviation (nm) of the height distribution are calculated by least square regression deeming the height distribution of the protrusions as the Gaussian distribution (a Gaussian distribution of which center is the point of zero height). The flatness of protrusions $\beta$ is defined as the ratio d/H of the mean diameter of protrusions d to the mean height of protrusions H.

(9) Coefficient of Friction y

Using a commercially available tape running tester (TBT-300 type manufactured by Yokohama System Kenkyusho, Japan was used), the sample tape is made to run at 20° C., 60% RH, and the coefficient of friction y is calculated in accordance with the following equation:

$$y = (1/\pi)\ln(T_2/T_1)$$

wherein $T_1$ is the tension in the entering side and $T_2$ is the tension in the exiting side. The diameter of the guide is 6 mm, the material of the guide is SUS27 (surface roughness of 0.2S), the winding angle is $\pi$ rad, and the running speed is 3.3 cm/min.

(10) Intrinsic Viscosity [$\eta$] (expressed in dl/g)

The intrinsic viscosity is calculated from the solution viscosity in o-chlorophenol measured at 25° C. according to the following equation:

$$\eta_{sp}/C = [\eta] + K[\eta]^2 \cdot C$$

wherein $\eta_{sp}$ = (solution viscosity/solvent viscosity) − 1, C is the weight of dissolved polymer per 100 ml of solvent (g/100 ml, usually 1.2), K is the Huggins' constant (0.343). The solution viscosity and the solvent viscosity are measured using Ostwald viscometer.

(11) Density

The difference between the density of the film and the density of the inert particles is defined as (density of inert particles—density of film). The density of the particles and the density of the film are measured as follows:

a. Density of Inert Particles

The density of inert particles is measured in accordance with JIS-Z-8807.

b. Density of Film

The density of the film is measured using a density gradient tube of tetrachloroethane/n-heptane at 25° C.

(12) Dubbing

A magnetic pigment with the following composition is applied on the film with a gravure roll coater, and the coated magnetic pigment is magnetically oriented and dried. The magnetic film is subjected to a calender treatment with a small test calender apparatus (steel roll/Nylon roll, five steps), at a temperature of 70° C. with a linear pressure of 200 kg/cm, followed by curing at 70° C. for 48 hours. The coated film is slit into ½ inch to prepare a pancake. From this pan cake, tape with 250 m length is taken and is set in a VTR cassette to prepare a VTR cassette tape.

| (Composition of Magnetic Pigments in parts by weight) | |
|---|---|
| Co-containing iron oxide (BET value 50 m²/g): | 100 |
| vinyl chloride/vinyl acetate copolymer: | 10 |
| polyurethane elastomer | 10 |
| polyisocyanate | 5 |
| lecithin | 1 |
| methylethyl ketone | 75 |
| methylisobutyl ketone | 75 |
| toluene | 75 |
| carbon black | 2 |
| lauric acid | 1.5 |

On the thus prepared tape, 100% chroma signals from a commercially available television testing wave generator (TG7/U706 manufactured by Shibasoku Co., Ltd., Japan was used) are recorded using a home VTR. Chroma S/N of the regenerated signals are measured using a commercially available color video noise-measuring apparatus (925D/1 manufactured by Shibasoku Co., Ltd., Japan was used), this value being called as A here. On the other hand, a pan cake of a tape on which the same signals as mentioned above are recorded is dubbed to a pancake of a tape (containing no previously recorded signals) of the same kind using a magnetic field transcription type high speed print system (e.g., "Sprinter" manufactured by SONY, Japan), and the chroma S/N of the dubbed tape is measured as mentioned above, the value being called as B here. If the decrease in the chroma S/N (A−B) due to the dubbing is less than 4.0 dB, the tape is evaluated to have good dubbing, and if it is not less than 4.0 dB, the tape is evaluated to have bad dubbing.

(13) Scratch Resistance

The above-described tape is repeatedly made to run using a commercially available high speed tape running tester (running speed of 800 m/min, 10 passes). After the test, the film is observed with a microscope to check the scratches formed. If almost no scratches are formed, the scratch resistance of the film is evaluated to be high, and if not less than 3 scratches per the width of the tape are formed, the scratch resistance of the film is evaluated to be low.

[EXAMPLES]

The present invention will now be described based on the examples thereof. These examples are presented for the illustration purpose only and should not be interpreted in any restrictive way.

EXAMPLE 1

Ethyleneglycol sol (slurry) containing colloidal silica with an average diameter of 0.3 μm was prepared. The sodium content in the slurry was adjusted to 0.1% by weight with respect to the weight of the silica particles. After heating the ethyleneglycol slurry at 190° C. for 1.5 hours, it was subjected to ester interchange reaction with dimethyl terephthalate. The reaction product was filtered through a filter with an absolute filtration precision of 3 μm. The filtered slurry was subjected to polycondensation reaction to prepare master pellets of polyethylene terephthalate. The polycondensation reaction time was adjusted so as to adjust the intrinsic viscosity of the polymer to 0.80. The crystallization parameter $\Delta T_{cg}$ of the master pellets was 80° C. On the other hand, by a conventional process, pellets of polyethylene terephthalate with an intrinsic viscosity of 0.62 and a crystallization parameter $\Delta T_{cg}$ of 70° C. were prepared and mixed with the above-described master pellets in the ratio to attain the silica particle content of 0.5% by weight. The mixed pellets were then dried under reduced pressure (3 Torrs) at 180° C. for 3 hours. The resulting pellets were fed to an extruder and were fused at 300° C. The fused polymer was extruded from the extruder and the extruded sheet was wound on a casting drum with a surface temperature of 30° C. to cool and solidify the sheet to obtain a non-oriented film. The ratio of the width of the clearance of the spinneret slit to the thickness of the non-oriented film was 10. The non-oriented film was stretched in the longitudinal direction to 4.5 times the original length. This stretching was conducted in four steps utilizing the difference of the circumferential velocity of two pairs of rolls. The stretching temperature in the first, second, third and fourth step was 70°, 110°, 100° and 120° C., respectively. The thus obtained uni-oriented film was stretched in the transverse direction to 4.0 times the original length using a tenter at 100° C. with a stretching rate of 2,000%/min. The resulting film was heat set at 190° C. for 5 seconds while stretching the film in the transverse direction to 1.07 times the original length to obtain a biaxially oriented film with a thickness of 15 μm. The parameters of the film are shown in the table, which are within the range of the present invention. The scratch resistance of the film was excellent and the film had excellent dubbing. Both surfaces of this film had the same parameters.

EXAMPLES 2–8, COMPARATIVE EXAMPLES 1–7

Ethyleneglycol slurries each containing one or more kinds of inert particles having different diameters were prepared. After filtering these ethyleneglycol slurries through filters with different absolute filtration precision, the slurries were subjected to ester interchange reaction with dimethyl terephthalate, followed by polycondensation to prepare polyethylene terephthalate master pellets containing 1% by weight of particles. The master pellets were mixed with polyethylene terephthalate pellets which do not substantially contain particles to attain the prescribed concentration of the inert particles. After drying the mixed pellets under reduced pressure (3 Torrs) at 180° C. for 3 hours, they were fed to an extruder and were melt-extruded at 300° C. In this case, the ratio of the width of the clearance of the spinneret slit to the thickness of the non-oriented film was variously changed. The extruded sheet was wound on a casting drum with a surface temperature of 30° C. by the electrostatic casting to cool and solidify the extruded sheet to obtain non-oriented films. The thus obtained films were stretched in the longitudinal direction to 5.0 times the original length by employing varied number of stretching steps and temperature. The thus obtained uni-oriented films were stretched in the transverse direction to 4.0 times the original length using a tenter at 100° C. with a stretching rate of 5,000%/min. The resulting films were heat set at 200° C. for 5 seconds while stretching the films in the transverse direction to 1.05 times the original length to obtain biaxially oriented films with a thickness of 15 μm. The various parameters and properties of the film are shown in the table. As shown in the table, those films which have the parameters within the range defined in the present invention exhibited excellent scratch resistance and excellent dubbing. No films of which parameters were outside the range of the present invention exhibited the excellent scratch resistance and good dubbing. Both surfaces of each film had the same parameters.

TABLE

|  | Material of Particles | Average Particle Diameter (μm) | $\sqrt{(\beta/\sigma)}$* | Coefficient of Friction y | Equation (1)** |
| --- | --- | --- | --- | --- | --- |
| Example 1 | silica | 0.3 | 0.39 | 0.27 | satisfied |
| Example 2 | silica | 0.23 | 0.6 | 0.30 | satisfied |
| Example 3 | silica<br>silica | 0.3<br>0.6 | 0.30 | 0.23 | satisfied |
| Example 4 | calcium carbonate | 0.4 | 0.5 | 0.24 | satisfied |
| Example 5 | titanium dioxide | 0.5 | 0.25 | 0.26 | satisfied |
| Example 6 | crosslinked polystyrene | 0.4 | 0.41 | 0.27 | satisfied |
| Example 7 | polyimide | 0.5 | 0.29 | 0.25 | satisfied |
| Example 8 | poly(ether sulfone) | 0.25 | 0.58 | 0.30 | satisfied |
| Comparative Example 1 | silica | 0.8 | 0.08 | 0.20 | satisfied |
| Comparative | silica | 0.23 | 0.85 | 0.33 | satisfied |

TABLE-continued

| | | | | | |
|---|---|---|---|---|---|
| Example 2 | | | | | |
| Comparative Example 3 | silica | 0.35 | 0.60 | 0.24 | unsatisfied |
| Comparative Example 4 | silica | 0.6 | | | |
| Comparative Example 5 | titanium dioxide | 0.25 | 0.20 | 0.30 | satisfied |
| Comparative Example 6 | silica | 0.4 | 0.39 | 0.18 | unsatisfied |
| Comparative Example 7 | calcium carbonate | 0.3 | 0.39 | 0.36 | satisfied |
| Comparative Example 7 | silica | 0.4 | 0.12 | 0.26 | satisfied |

| | Equation (2)*** | Average Distance Between Adjacent Protrusions(μm) | Scratch Resistance | Dubbing**** |
|---|---|---|---|---|
| Example 1 | satisfied | 10 | Good | Good (1.5 dB) |
| Example 2 | satisfied | 6 | Good | Good (1.5 dB) |
| Example 3 | satisfied | 15 | Good | Good (2.0 dB) |
| Example 4 | satisfied | 15 | Good | Good (1.5 dB) |
| Example 5 | satisfied | 15 | Good | Good (2.3 dB) |
| Example 6 | satisfied | 10 | Good | Good (2.0 dB) |
| Example 7 | satisfied | 15 | Good | Good (1.5 dB) |
| Example 8 | satisfied | 8 | Good | Good (1.8 dB) |
| Comparative Example 1 | satisfied | 15 | Good | Bad (5.0 dB) |
| Comparative Example 2 | satisfied | 6 | Bad | Good (2.3 dB) |
| Comparative Example 3 | satisfied | 12 | Good | Bad (4.7 dB) |
| Comparative Example 4 | unsatisfied | 6 | Bad | Good (2.5 dB) |
| Comparative Example 5 | satisfied | 15 | Good | Bad (4.8 dB) |
| Comparative Example 6 | unsatisfied | 6 | Bad | Good (2.5 dB) |
| Comparative Example 7 | satisfied | 25 | Bad | Good (3.8 dB) |

Notes:
*$\sigma$: standard deviation of height distribution of protrusions;
$\beta$: mean flatness of protrusions

**$y \geq 0.171 \sqrt{(\beta/\sigma)} + 0.15$

***$y \leq 0.171 \sqrt{(\beta/\sigma)} + 0.25$

****The value in the parenthesis means the difference between the chroma S/N values before and after dubbing.

We claim:

1. A biaxially oriented polyester film comprising a polyester and inert particles, which film has at least one surface with protrusions formed by the existence of the inert particles, the surface having a parameter of surface topography $\sqrt{(\beta/\sigma)}$ of 0.1 to 0.7, the average distance between adjacent protrusions on the surface being not more than 20 μm, the coefficient of friction of the surface and the parameter of surface topography satisfying the following equations (1) and (2):

$$y \geq 0.171 \sqrt{(\beta/\sigma)} + 0.15 \quad (1)$$

$$y \leq 0.171 \sqrt{(\beta/\sigma)} + 0.25 \quad (2)$$

wherein y is the coefficient of friction, $\beta$ is mean flatness of protrusions and $\sigma$ is standard deviation of height distribution of protrusions.

2. The biaxially oriented polyester film of claim 1, wherein average distance of adjacent protrusions with a height of less than 0.08 μm is not more than 10 μm, average distance of adjacent protrusions with a height of 0.08–0.5 μm is 15–150 μm, and the difference between the average height of protrusions with a diameter of less than 1 μm and the average height of protrusions with a diameter of 1–8 μm is 0.02–0.42 μm.

3. The biaxially oriented polyester film of claim 1, wherein the crystallization promoting coefficient of the inert particles is not higher than 15° C.

4. The biaxially oriented polyester film of claim 1, wherein the difference between the density of the inert particles and the density of the film is not more than 0.65 g/cm$^3$.

5. The biaxially oriented polyester film of claim 4, wherein the inert particles are organic polymer particles.

6. The biaxially oriented polyester film of claim 4, wherein the inert particles are crosslinked polymer particles.

7. The biaxially oriented polyester film of claim 4, wherein the inert particles are crosslinked styrene-divinyl benzene copolymer microspheres.

* * * * *